(12) United States Patent
Cornell et al.

(10) Patent No.: US 9,531,708 B2
(45) Date of Patent: Dec. 27, 2016

(54) SYSTEMS AND METHODS FOR USING WEARABLE TECHNOLOGY FOR BIOMETRIC-BASED RECOMMENDATIONS

(71) Applicant: United Video Properties, Inc., Santa Clara, CA (US)

(72) Inventors: James Cornell, Chicago, IL (US); Andrew Fundament, Arlington Heights, IL (US); Melissa Bradley, Mt. Prospect, IL (US); Vanessa Wickenkamp, Elmhurst, IL (US); Andy Dustin, Palos Hills, IL (US)

(73) Assignee: Rovi Guides, Inc., San Carlos, CA (US)

(*) Notice: Subject to any disclaimer, the term of this patent is extended or adjusted under 35 U.S.C. 154(b) by 83 days.

(21) Appl. No.: 14/292,381

(22) Filed: May 30, 2014

(65) Prior Publication Data

US 2015/0350201 A1  Dec. 3, 2015

(51) Int. Cl.
*H04L 29/06* (2006.01)
*G06F 17/30* (2006.01)

(52) U.S. Cl.
CPC ..... *H04L 63/0861* (2013.01); *G06F 17/30867* (2013.01)

(58) Field of Classification Search
CPC ................ H04L 63/0861; G06F 17/30876
See application file for complete search history.

(56) References Cited

U.S. PATENT DOCUMENTS

| | | | |
|---|---|---|---|
| 5,649,061 A | 7/1997 | Smyth | |
| 6,239,794 B1 | 5/2001 | Yuen et al. | |
| 6,388,714 B1 | 5/2002 | Schein et al. | |
| 6,564,378 B1 | 5/2003 | Satterfield et al. | |
| 6,605,038 B1* | 8/2003 | Teller | A61B 5/411 128/904 |
| 6,756,997 B1 | 6/2004 | Ward, III et al. | |
| 7,165,098 B1 | 1/2007 | Boyer et al. | |
| 7,245,273 B2 | 7/2007 | Eberl et al. | |
| 7,693,869 B2 | 4/2010 | Hutson et al. | |
| 7,761,892 B2 | 7/2010 | Ellis et al. | |
| 7,818,395 B2* | 10/2010 | Pizano | G06F 21/6245 709/217 |

(Continued)

FOREIGN PATENT DOCUMENTS

| | | |
|---|---|---|
| CN | 103331023 | 10/2013 |
| EP | 2 544 460 | 1/2013 |

(Continued)

OTHER PUBLICATIONS

"A better wearable brain-computer interface", retrieved on Feb. 26, 2015 (dated Aug. 16, 2011), 2 pages.

(Continued)

*Primary Examiner* — Joseph P Hirl
*Assistant Examiner* — J. Brant Murphy
(74) *Attorney, Agent, or Firm* — Ropes & Gray LLP

(57) ABSTRACT

Methods and systems are disclosed herein for determining a biometric state of a user or an emotional state of a user. Based on the determined biometric state or emotional state, a determination is made whether information about a location is restricted. In response to determining that information about a location is restricted, a portion of the information about the location is identified, and access to the portion of the information is disabled.

18 Claims, 9 Drawing Sheets

(56) References Cited

U.S. PATENT DOCUMENTS

| | | | |
|---|---|---|---|
| 8,046,801 B2 | 10/2011 | Ellis et al. | |
| 8,170,656 B2 | 5/2012 | Tan et al. | |
| 8,332,883 B2 | 12/2012 | Lee et al. | |
| 8,350,804 B1 | 1/2013 | Moll | |
| 8,369,939 B2 | 2/2013 | Terada et al. | |
| 8,373,768 B2 | 2/2013 | Bill | |
| 8,392,250 B2 | 3/2013 | Pradeep et al. | |
| 8,418,193 B2 | 4/2013 | Saito et al. | |
| 8,560,100 B2 | 10/2013 | Sarkis et al. | |
| 8,676,230 B2* | 3/2014 | Alexander | H04L 63/0861 455/456.1 |
| 8,902,045 B1* | 12/2014 | Linn | G06F 21/32 340/5.53 |
| 2002/0077534 A1 | 6/2002 | DuRousseau | |
| 2002/0162031 A1* | 10/2002 | Levin | H04L 63/0861 726/7 |
| 2002/0174430 A1 | 11/2002 | Ellis et al. | |
| 2003/0110499 A1 | 6/2003 | Knudson et al. | |
| 2005/0251827 A1 | 11/2005 | Ellis et al. | |
| 2005/0285747 A1* | 12/2005 | Kozlay | G08B 21/22 340/573.4 |
| 2005/0289058 A1* | 12/2005 | Hoffman | C07K 14/53 705/44 |
| 2006/0106734 A1* | 5/2006 | Hoffman | C07K 14/53 705/64 |
| 2006/0142968 A1 | 6/2006 | Han et al. | |
| 2007/0050636 A1* | 3/2007 | Menczel | G06K 9/00885 713/186 |
| 2008/0177197 A1* | 7/2008 | Lee | A61B 5/165 600/545 |
| 2009/0023422 A1* | 1/2009 | MacInnis | A61B 5/0024 455/411 |
| 2009/0083850 A1* | 3/2009 | Fadell | G06F 21/316 726/19 |
| 2009/0089833 A1 | 4/2009 | Saito et al. | |
| 2009/0150919 A1 | 6/2009 | Lee et al. | |
| 2009/0214060 A1 | 8/2009 | Chuang et al. | |
| 2009/0326406 A1 | 12/2009 | Tan et al. | |
| 2010/0153885 A1 | 6/2010 | Yates | |
| 2010/0249636 A1 | 9/2010 | Pradeep et al. | |
| 2010/0291963 A1 | 11/2010 | Patel et al. | |
| 2011/0071416 A1 | 3/2011 | Terada et al. | |
| 2011/0077548 A1 | 3/2011 | Torch | |
| 2011/0134026 A1 | 6/2011 | Kang et al. | |
| 2011/0209214 A1* | 8/2011 | Simske | G06F 21/32 726/21 |
| 2012/0029322 A1 | 2/2012 | Wartena et al. | |
| 2012/0078820 A1 | 3/2012 | Azam | |
| 2012/0090003 A1 | 4/2012 | Dove et al. | |
| 2012/0197737 A1 | 8/2012 | LeBoeuf et al. | |
| 2012/0295589 A1* | 11/2012 | Alexander | H04L 63/0861 455/411 |
| 2013/0012829 A1 | 1/2013 | Jo | |
| 2013/0063550 A1 | 3/2013 | Ritchey et al. | |
| 2013/0109995 A1 | 5/2013 | Rothman et al. | |
| 2013/0133055 A1* | 5/2013 | Ali | H04L 63/0861 726/7 |
| 2013/0205311 A1 | 8/2013 | Ramaswamy et al. | |
| 2014/0033322 A1* | 1/2014 | Nair | G06F 21/00 726/27 |
| 2014/0059695 A1* | 2/2014 | Parecki | G06F 21/60 726/26 |
| 2014/0068723 A1* | 3/2014 | Grim | H04L 63/08 726/4 |
| 2014/0089673 A1* | 3/2014 | Luna | H04L 63/0861 713/186 |
| 2014/0096152 A1 | 4/2014 | Ferens et al. | |
| 2014/0098116 A1 | 4/2014 | Baldwin | |
| 2014/0109142 A1 | 4/2014 | van Coppenolle et al. | |
| 2014/0126877 A1 | 5/2014 | Crawford et al. | |
| 2014/0169596 A1 | 6/2014 | Lunner et al. | |
| 2014/0223462 A1 | 8/2014 | Aimone et al. | |
| 2014/0282945 A1* | 9/2014 | Smith | G06F 21/32 726/6 |
| 2014/0369537 A1 | 12/2014 | Pontoppidan et al. | |
| 2015/0002387 A1* | 1/2015 | Cai | G06F 3/014 345/156 |
| 2015/0012950 A1 | 1/2015 | Corl | |
| 2015/0150074 A1* | 5/2015 | Nolan | G06F 19/3418 726/1 |
| 2015/0261946 A1* | 9/2015 | Yoon | G06F 21/34 726/19 |

FOREIGN PATENT DOCUMENTS

| | | |
|---|---|---|
| WO | WO 2010/104879 | 9/2010 |
| WO | WO 2011/123059 | 10/2011 |
| WO | WO 2014/138925 | 9/2014 |

OTHER PUBLICATIONS

"Brain Computer Interface used to control the movement and actions of an android robot", retrieved on Feb. 26, 2015 (Nov. 13, 2012), 2 pages.

"Chinese television maker Haier announces brain-controlled TV", retrieved on Feb. 26, 2015 (dated Sep. 2, 2011), 2 pages.

"Disruptions Brain Computer Interfaces Inch Closer to Mainstream", retrieved on Feb. 26, 2015 (dated Apr. 28, 2013), 4 pages.

"Haier's Brain-Controlled TV Doesn't Actually Control Anything", retrieved on Feb. 26, 2015 (dated Jan. 11, 2012), 1 page.

"Haier's mind control TV prototype hits IFA, we go foreheads-on (video)", retrieved on Feb. 26, 2015 (dated Sep. 3, 2011), 3 pages.

"Hitachi Creates Brain 'Remote Control'", retrieved on Feb. 26, 2015 (dated Jun. 22, 2007), 3 pages.

"Hitachi Demos 'Brain-Machine Interface' as TV Remote", retrieved on Feb. 26, 2015 (dated Jan. 12, 2010), 2 pages.

"Hitachi's develops brain signal-powered remote control", retrieved on Feb. 26, 2015 (dated Jan. 4, 2010), 1 page.

"Ignorance at the Heart of Science Incredible Narratives on Brain-Machine Interfaces", retrieved on Feb. 26, 2015 (undated), 31 pages.

"Learning to Use Brain-Computer Interfaces", retrieved on Feb. 26, 2015 (dated Jun. 10, 2013), 2 pages.

"Rovi Team Experiments with Brainwaves Project to Control TV," retrieved on Feb. 26, 2015 (dated Jan. 13, 2014), 2 pages.

"Wearable Computers as Intelligent Agents", retrieved on Feb. 26, 2015 (undated), 7 pages.

"Wearable Electronics Demonstrate Promise of Brain-Machine Interfaces", retrieved on Feb. 26, 2015 (dated Aug. 16, 2011), 2 pages.

"Why Brain-Controlled Gadgets Will Blow Your Mind", retrieved on Feb. 26, 2015 (dated May 7, 2013), 4 pages.

"World's First Brain-Controlled Smart TV Powered by NeuroSky", retrieved on Feb. 26, 2015 (dated Aug. 8, 2011), 3 pages.

Bos, Danny Oude, "EEG-based Emotion Recognition, The Influence of Visual and Auditory Stimuli," Department of Computer Science, University of Twenle, 2006, 17 pages.

Chen, et al., "The use of a brain computer interface remote control to navigate a recreational device." Mathematical Problems in Engineering (Oct. 21, 2013), 9 pages.

Frank et al., "Biofeedback in medicine: who, when, why and how?" Ment. Health Fam. Med., Jun. 2010, 8 pages.

Hamadicharef et al., "Learning EEG-based Spectral-Spatial Patterns for Attention Level Measurement," Institute for Infocomm Research, 2009, 4 pages.

International Search Report and Written Opinion for PCT/US2014/046125 dated Sep. 22, 2014, 9 pages.

Jurcak et al "10/20, 10/10, and 10/5 systems revisited: Their validity as relative head-surface-based positioning systems." NeuroImage 34.4 (Jan. 4, 2007): p. 1600-1611.

Kastelein, "NeuroSky, Brain-Computer Interface Technologies," Published Nov. 11, 2013 (downloaded Nov. 15, 2013, http://technode.com/2011/08/18/world%E2%80%99s-first-brain-controlledsmart-tv-powered-by neurosky/), 3 pages.

(56) References Cited

OTHER PUBLICATIONS

Larsen, Erik Andreas. "Classification of EEG Signals in a Brain-Computer Interface System." (Jan. 17, 2011), 72 pages.
Lim, "World's First Brain-Controlled Smart TV Powered by NeuroSky," Published Aug. 11, 2011 (downloaded Nov. 15, 2013, http://www.appmarket.tv/transmedia/2343-neurosky-company-behind-brainpowered-tv-brings-its-smart-sensors-to-newverticals.html?utm_source=TV+App+Market+Newsletter), 3 pages.
Lin et al. "Wearable and wireless brain-computer interface and its applications." Foundations of augmented cognition. Neuroergonomics and operational neuroscience. Springer Berlin Heidelberg, (2009). p. 741-748.
Rybak et al., "Frontal Alpha Asymmetry in Aggressive Children and Adolescents with Mood and Disruptive Behavior Disorders," Cl in. EEG Neurosci. 37: 16-24, 2006.
Tan, Bao Hong, Using a Low-cost EEG Sensor to Detect Mental States, CMU-CS-12-134, School of Computer Science, Carnegie Mellon University, Aug. 2012, 76 pages.
Wyczesany, Miroslaw et al., "Subjective mood estimation co-varies with spectral power EEG characteristics," Department of Psychophysiology, Jagiellonian University, Krakow, Poland, Acta Neurobiol Exp, 68: 180-192, 2008.
Yamasaki et al., "Dissociable prefrontal brain systems for attention and emotion," PNAS, vol. 99, No. 17, 2002, 5 pages.

\* cited by examiner

SYSTEMS AND METHODS FOR USING WEARABLE TECHNOLOGY FOR BIOMETRIC-BASED RECOMMENDATIONS

BACKGROUND

In conventional systems, consumers of media have a plethora of content options available. For example, the rise in content available via cable, satellite, on-demand, and/or Internet systems provides users with ever increasing amounts of content options. Given the vast plethora of content available, particularly on mobile devices, users may be tempted to access media even when not in their best interests. For example, when a user's judgment is impaired, the user may be tempted to search for content or locations that may result in adverse consequences for the user or other parties surrounding or related to the user.

Biometric devices offer information about users that can be used to control and access the plethora of content. Biometric devices enable access to a diversity of information such as physiological information and psychological information about a user which can be used to restrict user access to certain content or location information based on a determined biometric state of the user.

SUMMARY

Accordingly, methods and systems are disclosed herein for determining a biometric state of a user in order to determine whether information about a location should be restricted. Restricting user access to certain information about a location can prevent a user from taking certain actions with adverse consequences at the location when the user's judgment is impaired. For example, a user may be drunk and searching for nearby liquor stores to further inebriate himself. A user device may determine that the user is drunk and restrict access to map information about nearby liquor stores in order to prevent the user from further imbibing, which may result in bodily harm to the user or others around the user. The further imbibing may exacerbate damage to the user's liver, and may result in the user causing harm to others, for example, if the user drove a car while inebriated.

In some aspects, the methods and systems described herein may determine a biometric state of a user. For example, a user device may monitor biometric information of the user, such as blood alcohol level. The user device may determine whether the determined biometric state causes information about a location to be restricted. For example, the user device may cross-reference the blood alcohol level with a database to determine that the user is drunk, and that geographic information about liquor stores should be restricted. In response to determining that the biometric state of the user causes information about a location to be restricted, the user device identifies a portion of the information that is restricted. For example, the user device may determine based on the cross-referencing that directions to liquor stores should be disabled from a map application. Access to the identified portion of information is disabled. For example, the user device may restrict access to information about directions to liquor stores from a map application. When the user accesses a map application using the user device, directions to liquor stores may be restricted from display.

In some embodiments, the methods and systems disclosed herein provided for determining the biometric state also provide for determining an emotional state of the user based on the biometric state. For example, a user device may determine that a user has an elevated pulse, body temperature, and elevated level of norepinephrine in the blood, indicating that the user is in an angry emotional state. In these embodiments, the cross-referencing of the biometric state with a same or different database includes cross-referencing the determined emotional state with a database to determine whether the biometric state and the emotional state of the user cause information about the location to be restricted. Cross-referencing the emotional state with the database may provide additional context for restriction of information. For example, an emotional state-information restriction database may include an association between an angry emotional state and the category firearms so that information about locations of stores related to firearms is restricted when a user is angry.

In some embodiments, a determined biometric state includes a heart rate, pulse, blood oxygen level, body temperature and brain activity. The combination of various types of biometric states helps refine the determination of emotional states and also helps distinguish different categories of information for restriction.

In some embodiments, the methods and systems disclosed herein provide for a identifying a portion of information that is not restricted and, in response to a user request for available information about a restricted location, presenting the portion of information that is not restricted to a user. For example, a user device implementing a map location may receive a search for shopping centers from a user. In response, the user device may retrieve a directory of stores within a shopping center closest in location to the user. If the user is in an angry emotional state, the user device may determine that information related to a category of guns may be restricted and generate a message for display to the user that certain information about the shopping center is restricted. The application may identify stores in the retrieved directory that are not related to the category of guns and present the stores for display to the user upon receiving a request from the user to access information that is not restricted.

In some embodiments, the portion of information that is restricted relates to geographical coordinates. For example, when a user device determines that the user is in an angry state, the user device may disable access to locations of gun stores on a display of a map of the shopping center.

In some embodiments, the methods and systems disclosed herein providing for disabling access to the portion of information that is restricted include filtering data provided to the user. For example, the user device may retrieve a directory of listings for stores in a shopping center for a user. The user device may determine that the user is in an angry emotional state and the category of guns should be restricted. The map application may then filter listings for gun stores from a display of the directory listings for stores in the shopping center.

In some embodiments, the methods and systems disclosed herein provide for receiving criteria for the portion of information that is restricted and comparing the information about the location to the criteria in order to identify the portion of the information that is restricted. For example, a user device may receive search criteria for "nearby contacts" to search for contacts that are within a proximity of a user. The user device may determine that a user is in an angry emotional state, and that all contacts in the category co-workers should be restricted. The user device may compare the set of contacts in the category co-workers and the set of contacts determined to be within the proximity of the user, and remove the overlap.

For example, the criteria may be a type of information to be restricted, such as address information. The user device may receive a directory of listings for a number of stores, including address information and operating hours for each of the stores. The user device may determine that a user is in an angry emotional state and that criteria including address information and opening hours about locations related to the category of guns should be restricted. The user device may compare information in the listings for the number of stores with the criteria, including address information and opening hours, and restrict access to information about the address and opening hours of gun stores while enabling access to other information that is not part of the criteria, such as names of the gun stores.

In some embodiments, the portion of the information that is restricted is based at least in part on a current time of day. For example, a user device may determine that a user is in an angry emotional state and that a current time of day is 3:00 PM in the afternoon. The user device may determine that, based on the time of day, there is sufficient surveillance and law enforcement to prevent or respond to the user should the user perform actions with adverse consequences. The user device may determine, based on the current time of 3:00 PM, that information to the category of guns will not be restricted even though the user is angry. In contrast, the user device may determine that the user is in an angry emotional state and that a current time of day is 2:00 AM. The user device may determine that based on the time of day (early morning), there is insufficient surveillance and law enforcement to prevent or respond to the user. Accordingly, the user device may determine based on the current time of 2:00 AM that information to the category of guns will be restricted.

In some embodiments, the portion of the information that is restricted is based at least in part on a location of a user. For example, a user device may include a predetermined threshold distance for restricting information about locations to a user. The user device may determine that a user is in an angry emotional state, and that information related to the category of guns that are within a 12-mile radius of the user's location should be restricted. The user device may restrict access to information about locations of gun stores that are within a 12-mile radius of the user, and enable access to gun stores that are outside the 12-mile radius of the user.

In some embodiments, the portion of the information that is restricted is based at least in part on a likelihood that the user may reach a location given the biometric state of the user. For example, a user device may determine that a user is in an angry emotional state. Based on prior monitoring of the user, the user device may also determine that the user is in a physically exhausted state, after strenuous exercise, and thus is unlikely to move around in the present biometric state. Accordingly, the user device may not restrict information associated with the angry emotional state such as locations of gun stores because there is a low likelihood that the user may travel to the gun store. Alternatively, the user device may determine that a user is in an angry emotional state. Based on prior monitoring of the user, the user device may also determine that the user is in a rested physical state and is likely to move around in the present biometric state. Accordingly, the user device may restrict information associated with the angry emotional state because the user is likely to travel to locations associate with the angry emotional state.

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF DRAWINGS

Figure 1A:
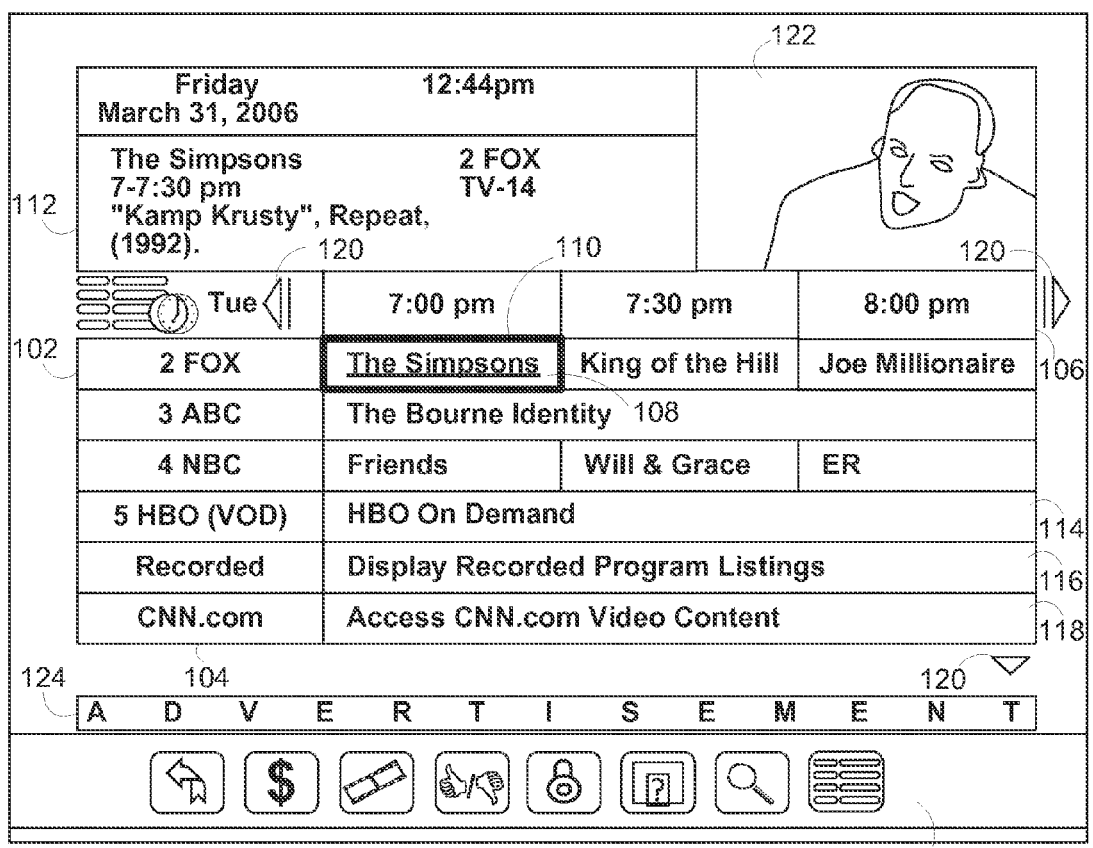
FIG. 1A shows an illustrative media guidance application for selecting media assets in accordance with some embodiments of the disclosure.

Methods and systems are disclosed herein for determining a biometric state or an emotional state of a user and to restrict access to information based on the determined biometric state or emotional state. Access to information may be disabled in an application. The information to be restricted may include media assets, personal information, contact information, location information, or any other suitable information. As referred to herein, the term "biometric state" should be understood to mean a metric or measure indicative of a physiological state of a user, such as measurements of chemical content in body fluids (e.g., salt electrolyte concentration in perspiration, blood alcohol level, hormonal levels in blood, glucose level in blood, oxygen content of blood), measurements of circulation (e.g., pulse, heart rate), body temperature, brain activity (e.g., measured via electroencephalograms), or any other suitable measurements. As referred to herein, the term "emotional state" should be understood to mean a metric of measure indicative of a psychological state or mental state of a user, such as angry, sad, depressed, happy, agitated, bored, or any other suitable state.

With reference to media assets or content, the amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 1B:
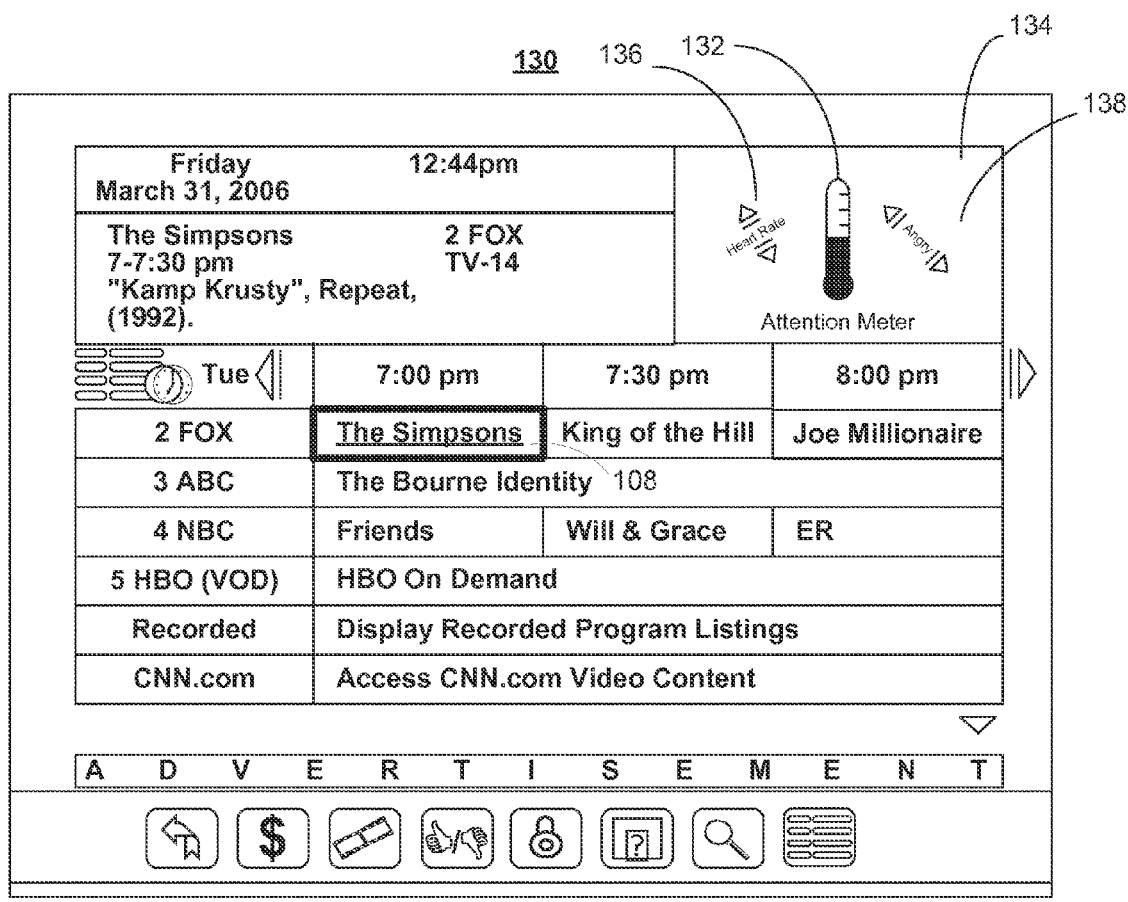
FIG. 1B shows an illustrative media guidance application for selecting media assets featuring an on-screen icon associated with a biometric state of a user in accordance with some embodiments of the disclosure.
Figure 1C:
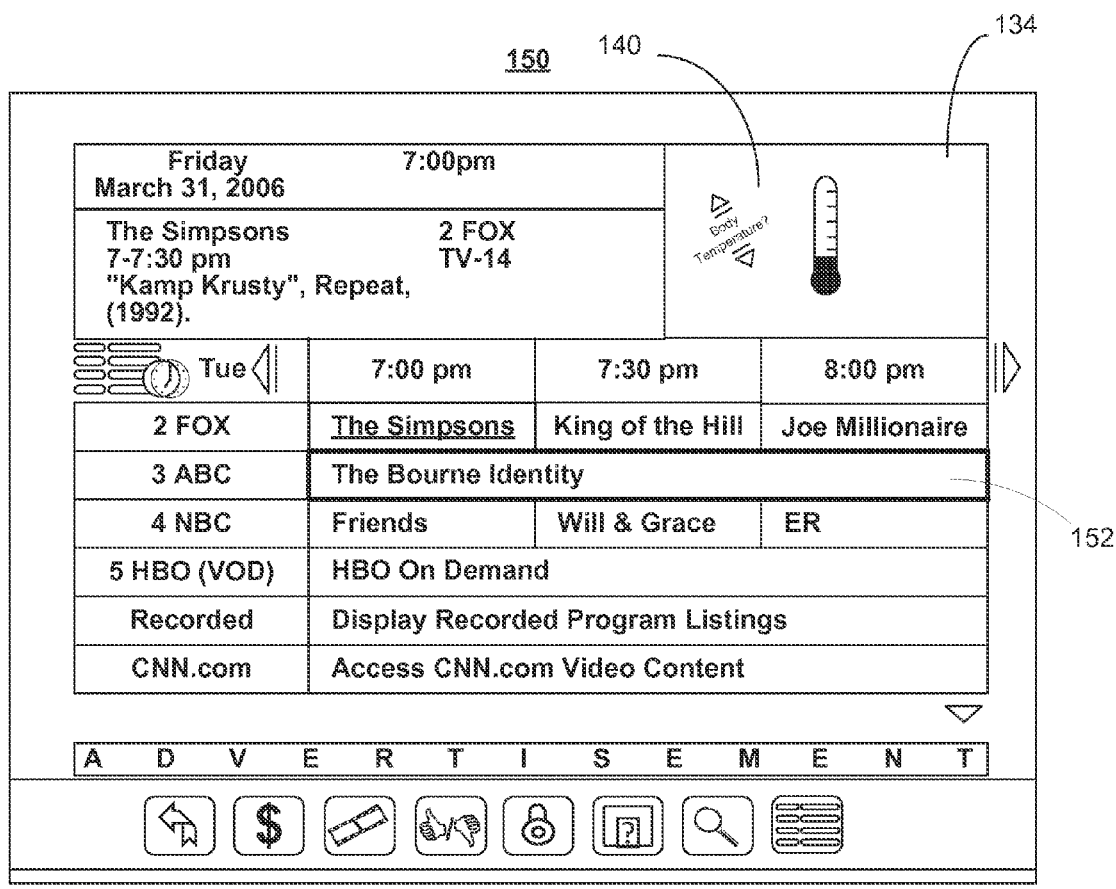
FIG. 1C shows an illustrative media guidance application for selecting media assets featuring an on-screen icon indicating a biometric state of a user in accordance with some embodiments of the disclosure.
Figure 2:
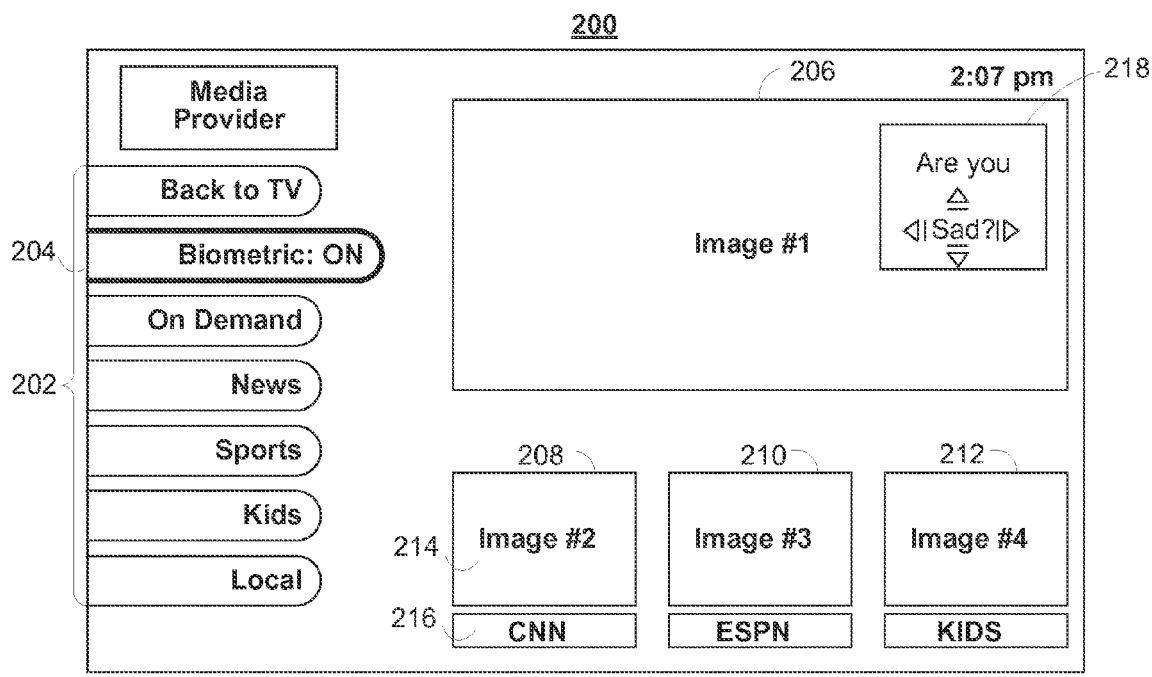
FIG. 2 shows an illustrative media guidance application that may be used to adjust user settings in accordance with some embodiments of the disclosure.

FIGS. 1A to 1C and 2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1A shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information. The cells of grid 102 may be reconfigured or filtered based on a biometric state or emotional state determined from a user. For example, if a media guidance application determines that a user is experiencing heart palpitations, the media guidance application may disable access to certain program listings related to action movies, such as "The Bourne Identity," in order to prevent the user from accessing media assets that may further aggravate a user's heart palpitations. For example, a media guidance application may determine that a user is depressed, and in response, sort cells of program grid 102 by channels, ranking the channels by a metric for quantifying a comedic aspect of a currently broadcast program. In this example, the sorting of the program grid by a metric of a comedic aspect presents programs that are likely to be humorous to a user in order to adjust the emotional state of a user.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

In some embodiments, a media guidance application may recommend one or more program listings based on a biometric state or emotional state determined from a user. For example, a media guidance application may determine that a user is happy and recommend program listing 108 by setting highlight region 110 on program listing 108.

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

In some embodiments, video region 122 may allow a user to view location information. As referred to herein, "location" refers to any relative or absolute identifier of a position, such as a geographical coordinate, vector for direction, street address, name of building, or any other suitable identifier. For example, a location may be indicated by coordinates in a geographic coordinate system (e.g., latitude or longitude), or a global positioning system (GPS). For example, a user may select a program listing to view location information associated with the program listing. In response to receiving a user selection of Internet content listing 118, the media guidance application may generate for display a map showing locations of news events in video region 122. The media guidance application may determine that a user is in a depressed emotional state, and in response, filter locations of news events that are within a proximity (e.g., 10 miles) to a user. By filtering locations of news events within the proximity, the media guidance application may prevent the user from going to the site of the news events, which may further depress the user.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

In some embodiments, advertisement 124 may be selected based on a biometric state or emotional state determined from a user. For example, a media guidance application may determine that a user has high blood pressure, and in response, provide an advertisement for high blood pressure medication.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

In some embodiments, user profile information may include biometric state and/or emotional state information. For example, the user profile may include associations of biometric states and emotional states with different categories of information based on user interactions with an application. For example, a media guidance application may store a profile of user interactions with action movies when the user is in an angry emotional state and with drama movies when the user is in a depressed emotional state. The media guidance application may provide recommendations based on a determined biometric state and/or emotional state of a user and the stored user profile.

In some embodiments, the user interactions with the media guidance application may be used to develop associations between biometric states and emotional states, in cases where a biometric state may correspond to more than one emotional state. For example, elevated body temperature and elevated pulse rate may be associated with an angry emotional state, or a happy emotional state. Based on selections of program listings for viewing, a media guidance application may associate biometric states with user viewing selections to determine an emotional state of the user. For example, the media guidance application may determine that a user is in a biometric state having elevated body temperature and elevated pulse rate. The media guidance application may also determine that the user is viewing a comedy media asset and associate a happy emotional state with viewing a comedy media asset and the biometric state of elevated body temperature and pulse rate. The media guidance application may store the association in a database for subsequent cross-referencing. The media guidance application may also correlate other biometric states with emotional states corresponding to viewing activity. For example, the media guidance application may have previously determined that when the user is in a biometric state of elevated body temperature and pulse rate, and watching an action movie, the user is in an angry emotional state. The media guidance application may associate a new biometric state, an elevated norepinephrine level in the user's body with the angry emotional state, based on a correlation of elevated norepinephrine levels with elevated body temperature and pulse rate, while watching an action movie. Based on this information, the media guidance application may determine that the biometric state of elevated norepinephrine levels, in addition to elevated body temperature and pulse rate, is associated with an angry emotional state. The media guidance application may store this association in a database that corresponds to a user profile of the user, for use in subsequent determinations.

In some embodiments, user profile information may be transmitted to a server for processing. The user profile information may be used by a content provider to adjust plot paths to a user's biometric and/or emotional states for subsequent programming. The user profile information may also be used to calibrate cross-referencing databases used to associate biometric states with emotional states, and to associate biometric states and/or emotional states with information to be restricted. A pool of information from multiple users may be collected to determine common correlations between biometric states and emotional states.

FIG. 1B shows an illustrative media guidance application for selecting media assets featuring an on-screen icon associated with a biometric state or emotional state determined from a user. For example, in some embodiments, the media guidance application may generate a display of an on-screen icon that provides feedback to a user regarding the user's biometric or emotional state.

The icon may include a graphical representation of the biometric state or emotional state of the user (e.g., a graph indicating a current heart rate or level of happiness associated with a user). Additionally or alternatively, the icon may include textual information (e.g., descriptions of media guidance applications that may be performed and the biometric states or emotional states associated with each operation) and/or instructions (e.g., instructions on how to achieve a particular biometric state or emotional state).

In FIG. 1B, the media guidance application has currently generated a display of region 134 on display 130. Region 134 has several graphical representations. For example, region 134 includes graphical representation 132 of a "heart rate meter", which indicates a current heart rate of the user. The "heart rate meter" appears as a thermometer, which when exceeding a certain level (e.g., representing a particular threshold level of a heart rate) may trigger a particular media guidance application operation. The graphical representation 132 may also represent other biometric states and other emotional states, described further below in reference to detecting circuitry and control circuitry of FIG. 3.

As used herein, a "threshold state level" refers to a particular state level required for the media guidance application to perform an operation. For example, in response to detecting that the current heart rate level of a user exceeds the threshold heart rate level, the media guidance application may perform a particular media guidance application operation (e.g., generate a display of a currently highlighted program or recommend a program listing, such as program listing 108 by highlighting program listing 108).

The use of a graphical and/or animated representation in region 134 provides an intuitive system through which to provide feedback to a user regarding the biometric state or emotional state of the user. Additionally or alternatively, the media guidance application may generate other graphical representations in the form of any element that conveys a particular message to a user (e.g., whether a graph, video clip, inspirational message, etc.).

Region 134 also includes several graphical representations that are textual elements. The graphical representations may serve multiple purposes. For example, while an animated meter may provide a user with his/her current biometric state or emotional state related to performing one or more media guidance application operation, textual elements may provide a user instructions for performing a media guidance application operations (e.g., what threshold is needed to trigger the media guidance application operation) and/or indications of what media guidance application operations are available. Textual elements may also be used to confirm a biometric state or emotional state in order to calibrate a system, or to select a different biometric state or emotional state for monitoring. For example, region 134 includes a textual element 136 of "heart rate" that indicates to a user that the graphical representation 132 corresponds to a heart rate of the user. The textual element may also serve as a menu option. For example, a user may be able to scroll textual element 136 through other types of biometric states such as pulse, brain activity, body temperature, or any other suitable type of biometric state, discussed further below in reference to FIG. 3. In response to a selection of a type of a biometric state through textual representation 136, graphical representation 132 may be updated to correspond to the selected type of biometric state.

In addition, region 134 includes textual element 138. In some embodiments, textual element 138 indicates to the user a particular emotional state. For example, textual element 138 may indicate to a user that a determined emotional state of the user is "Angry." In some embodiments, textual element 138 may be used to confirm an emotional state of the user. For example, textual element 138 may serve as a menu option. For example, a user may be able to scroll textual element 138 through other emotional states to indicate a current perceived emotional state of the user. This indication of a current perceived emotional state of the user can be used to train an algorithm used by the media guidance application to determine an emotional state of the user.

In some embodiments, textual element 138 indicates to a user a media guidance application operation that is available. Textual element 138 may state, "'The Simpsons' has been recommended". For example, the media guidance application may respond to detecting a threshold state level of a heart rate of user by selecting a currently highlighted object (e.g., program listing 108); therefore, the media guidance application may provide textual element 138 to inform the user of the result of his/her threshold state level of a biometric state.

In some embodiments, region 134 may also indicate media guidance application operations that may occur in response to not detecting a particular biometric state or emotional state. For example, if the user is not determined to have a high heart rate corresponding to a level that exceeds a threshold state level, the media guidance application may automatically perform a particular media guidance application operation.

In some embodiments, the media guidance application may determine an operation of the media guidance application based on a time of day, in addition to a biometric state and an emotional state determined from a user. For example, FIG. 1C shows a display 150 of an illustrative media guidance application for selecting media assets featuring an on-screen icon indicating that a user currently has a low heart rate level. The media guidance application may determine that the heart rate level of a user is low and that the time is 7:00 PM in the evening, indicating that a user may have just come home from a long day at work and is exhausted. In response, the media guidance application may recommend a program in the action genre, such as the "The Bourne Identity" by highlighting program listing 152 for "The Bourne Identity." The media guidance application may recommend this program in order to vitalize or refresh a user and thereby increase the heart rate of the user to a nominal level.

In display 150, region 134, now includes new graphical representations that correspond to the media guidance application operation currently being performed. For example, the media guidance application has now generated a display of region 134 which includes textual element 140 that indicates a biometric state or emotional state determined from the user.

Another display arrangement for providing media guidance is shown in FIG. 2. Video mosaic display 200 includes selectable options 202 for content information organized based on content type, genre, and/or other organization criteria. In display 200, selectable option 204 is selected, thus initiating monitoring of a biometric state of a user by monitoring body temperature and body chemical levels (e.g., norepinephrine levels, epinephrine levels) of the user. In some embodiments, selectable option 204 may be a drop-down menu or other menu of selectable options for different types of biometric states of a user.

In some embodiments, media guidance application may generate location information for display in region 218, and restrict the location information based on a determined biometric state of a user. For example, listing 206 may correspond to a local news program. The media guidance application may generate for display a map that includes locations of news events described in the local news program. The media guidance application may determine that a user is in an angry emotional state and restrict access to location information for news events that are located within a predetermined proximity (e.g., 12 miles) of the user. In this way, the media guidance application can prevent the user from attempting to visit the site of the news events while in an angry state, where the user may further become incensed, or adversely affect other people at the location of the news event.

In some embodiments, the media guidance application may identify information for restriction based on a time of day or a likelihood that the user may reach the location of a news event. For example, the media guidance application may determine that the time is 2:00 AM in the morning, the user is in an angry emotional state and tired biometric state, and that a user is located at home. Based on the angry emotional state and tired biometric state of the user, the time of day, and the location of the user, the media guidance application may determine that the user is unlikely to leave home in the early morning. The media guidance application may not restrict access to location information for news events within the predetermined proximity of the user. Alternatively, the media guidance application may determine that the time of day is 3:00 PM in the afternoon, the user is in an angry emotional state and rested biometric state, and that the user is located at home. Based on the those determinations, the media guidance application may determine that the user is likely to leave home to go to a location of a news event near the home of the user, and restrict location information of news events near the home of the user.

In response to selectable option 204 being selected, the media guidance application has also generated for display region 218, which provides information about a determined biometric state or emotional state of a user. In some embodiments, the display region may include a selectable menu that includes options for different emotional states in order to confirm a determined emotional state of a user. For example, display region 218 may include the text "Are you 'Angry?'", where the term "Angry" can be changed to different perceived emotional state, for example, by using an input device such as a remote control with arrows. By adjusting the determined emotional state to a perceived emotional state in display region 218, a user can provide feedback to calibrate an algorithm used to determine an emotional state of the user based on the determined biometric state of the user.

In display 200 listings 206, 208, 210, and 212 may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listings 208, 210 and 212 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
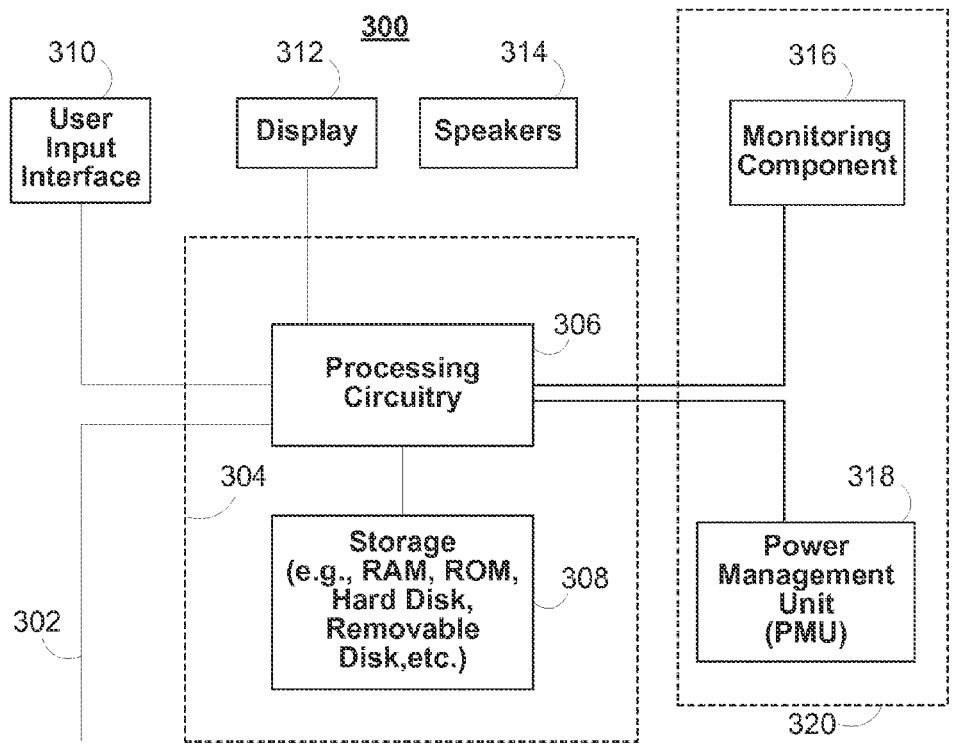
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306, detecting circuitry 320 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Control circuitry may also instruct detecting circuitry 320, which can be used to detect and/or identify a user or users without requiring the user or users to make any affirmative actions by using any suitable biometric determination technique, such as facial determination, body temperature determination, heart rate determination, odor determination, scent determination, body shape determination, voice determination, behavioral determination, any other suitable biometric determination technique or any combination thereof.

Detecting circuitry 320 may include monitoring component 316 and power management unit 318. Monitoring component 316 may include one or more components (e.g., an EEG, EMG, pulse oximeter, etc.) for monitoring a biometric state of a user.

It should be noted, monitoring component 316 may, in some embodiments, be located on a separate device in communication with the device upon which a media guidance application (and control circuitry 304) is implemented. For example, in some embodiments, monitoring component 316 may communicate with device 300 via a communications network (e.g., communications network 414 (FIG. 4)).

In some embodiments, monitoring circuitry may monitor brain activity of a user. Monitoring component 316 may transmit updates (e.g., associated with brain activity) of a user to control circuitry 304. Control circuitry 304 may compare the updates to data related to brain activity (e.g., threshold ranges, frequency ranges, etc.) of the user and/or other users stored on storage 308 (e.g., to determine whether or not the brain activity of the user corresponds to a particular threshold range and/or mood, attentiveness level, etc.).

In some embodiments, monitoring component 316 may include one or more of a temperature sensor, a pulse oximeter, a motion sensor, an accelerometer, an optical sensor, or any other suitable sensor for determining a biometric state of a user. Monitoring component 316 may include any suitable hardware and/or software to perform biometric detection and determination operations. For example, monitoring component 316 may include infrared, optical, and/or radio-frequency receivers and/or transmitters. Monitoring component 316 may additionally, or alternatively, include one or more microphones and/or cameras to detect audible and/or visual information, respectively. The microphone may be capable of receiving sounds within the audible range and/or outside the audible range. The camera may be capable of capturing information within the visual spectrum and/or outside the visual spectrum. For example, the camera may be able to capture infrared information, ultraviolet information, or any other suitable type of information.

In some embodiments, detecting circuitry 320 may additionally, or alternatively, include palm, fingerprint, and/or retinal readers for detecting and/or identifying users based on biometric information about a user. In some embodiments, detecting circuitry may communicate to processing circuitry 306 and/or storage 308 various detection and/or identification mechanisms indicating whether a user is detected and/or identified at a particular device.

For example, using an infrared camera and light source, processing circuitry 306 may generate a three-dimensional map of an area. A plurality of IR beams may each be modulated and encoded to be distinguishable, transmitted from the IR light source and directed at various points in an area. Each of the beams may reflect off objects in the room back towards the camera. Depending on the distance traveled by each light beam, the time of flight, or time traveled by each light beam may vary. If the IR camera and light source are placed side by side, travel time of the light beam may correlate to the distance of an object from the light source and camera. The time of flight may be measured as the time between transmission of the encoded beam from the light source and detection of the encoded beam at the camera. By correlating the time of flight of beams, and the initial direction of the beam, processing circuitry 306 and/or detecting circuitry 320 may generate the three-dimensional map of the area. Based on the three-dimensional map, control circuitry 304 may detect and identify distinct bodies of users, and determine distance of the body from the biometric device. Using color cameras and face detection, control circuitry 304 may detect or identify users.

Using microphones and voice recognition, control circuitry 304 may detect or identify users based on the physical characteristics of their vocal tract through voice recognition or identification. Using a sound source and an array of microphones, control circuitry 304 may determine information about the shape of the area surrounding the biometric device through acoustic localization, similar to the time-of-flight method described above in reference to IR light. For example, a sound source may be located near an array of microphones. A sound broadcast from the sound source may propagate as a wave front away from the source. As the wave front impacts an object, portions of the wave front may be reflected toward the sound source and array of microphones. Depending on the position of the object, the reflected sound may arrive at the microphone at different times. For example, the reflected sound may arrive at a closer microphone in a shorter amount of time than at a farther microphone. Based on the time or phase difference in arrival time at various microphones, total travel time of the sound, and positions of the microphones, it may be possible to generate a spatial areal map. Location of objects may be determined based on the spatial areal map generated via acoustic localization, IR time of flight, any other suitable mapping method, or any combination thereof. It should be understood that various biometric techniques and devices may be used alone, or in combination to supplement each other to more accurately identify or detect users.

In some embodiments voice recognition may be used to determine biometric and/or emotional states. For example, voice recognition may be performed on speech of a user to find words spoken during certain biometric states. Detecting circuitry 320 or control circuitry 304 may correlate spoken words and other biometric states such as heart rate and body temperature for storage in cross-referencing databases. Analysis and correlation of vocal tones may also be performed.

In some embodiments, detecting circuitry 320 may use any suitable method to determine the distance, trajectory, and/or location of a user in relation to an electronic device. The electronic device may also use, for example, triangulation and/or time-difference-of-arrival determination of appropriate information to determine a user's location in relation to an electronic device. For example, time-difference-of-arrival values of sounds emanating from a user may be determined. In some embodiments, any suitable image processing, video processing, and/or computer vision technique may be used to determine a user's distance, trajectory, and/or location in relation to an electronic device. A user's distance, trajectory, and/or location in relation to an electronic device may be determined using any suitable method.

In some embodiments, detecting circuitry 320 and/or control circuitry may conduct analysis on information from one or more monitoring components 316 to determine gestures. For example, movements of a hard, detected by an accelerometer worn on a write of a user may be used to determine gestures at certain points in time. The gestures may be correlated with other biometric states and/or emotional states.

In some embodiments, processing circuitry 306 may determine a location based on global positioning system (GPS) measurements, or, in the case of cellular telephones, measurements based on cell-tower signals, done by detecting circuitry 320. Processing circuitry 306 may use these measurements to determine location coordinates, which may be transmitted to other electronic devices. The processing circuitry may determine a location of the user to determine whether or not to restrict information about a location for access by the user. In some embodiments, processing circuitry of a user device may determine location information (e.g., geographic coordinates), that is to be restricted from a user. For example, a first user device of a first user may determine a location of the first user. A second user device of a co-worker of the first user may determine a location of the co-worker. The first user device may determine that the user is in an angry emotional state, based on a biometric state of the user, and determine that location information about co-workers of the first user should be restricted from the first user. The first user device may restrict access to the determined location of the co-worker, for example, by filtering the location information of the co-worker from display on a map application of the first user device.

In some embodiments, detecting circuitry may be used to identify a user based on a determined biometric state or biometric information about the user. An identified user may refer to a user who may be recognized sufficiently by a device to associate the user with a user profile. In some embodiments, the user may be associated with a group of users, as opposed to, or in addition to, being associated with a unique user profile. For example, the user may be associated with the user's family, friends, age group, sex, and/or any other suitable group. A detected user may refer to a user whose presence is detected by a device, but who is not yet identified by the device.

In some embodiments, contextual information determined from biometric information can further refine determined biometric states of a user and aid in determining emotional states of a user. For example, control circuitry may perform speech analysis on a user's voice to determine words spoken by a user and correlate the words with other biometric information such as body temperature and heart rate. For example, elevated body temperature and elevated heart rate could correspond to excitement from a happy emotional state or an angry emotional state. If control circuitry determines the spoken words to be expletive words, the control circuitry may determine an angry emotional state. If the spoken words are determined to be associated with a jovial mood, a happy emotional state may be determined. Control circuitry may also conduct speech analysis to examine vocal tones of a user's speech. Strident vocal tones may indicate an angry emotional state, while mellow tones may indicate a calm emotional state.

The contextual information may also include gesture information, determined based on movements of a user. For example, control circuitry may determine gestures based on accelerometers in wearable devices of a user. Rapid gestures may indicate an angry emotional state, while slow regular movements may indicate a calm emotional state.

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
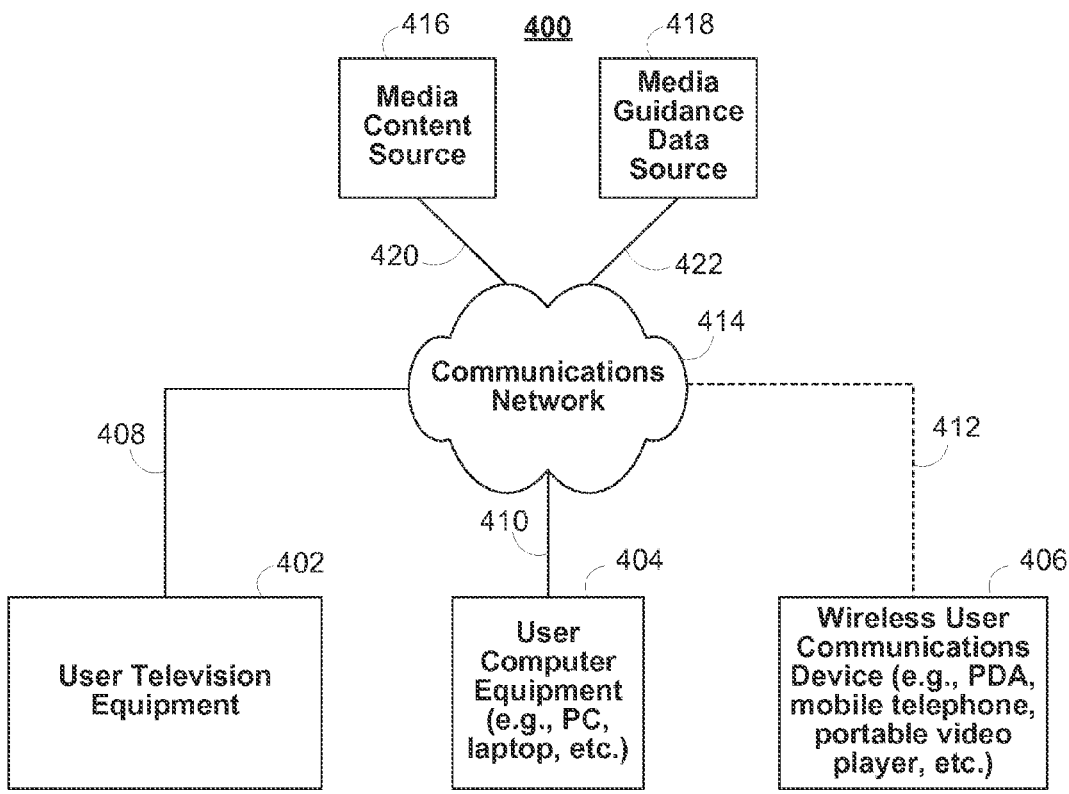
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, biometric states, emotional states, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

In some embodiments, wireless user communications device 406 may include wearable devices that are positioned on a user. For example, wireless user communications device 406 may include smart eyewear, smart watches, any other suitable user device that is wearable, or any combination thereof. The type of wearable device may affect the type of biometric state that can be determined. For example, a wearable headset device may include electrodes as part of monitoring component 316 and may be able to determine and monitor brain activity of a user. For example, a wearable ring device may include a temperature sensor to detect body temperature and may include a pulse oximeter to determine a pulse rate and a blood oxygen level.

Figure 5A:
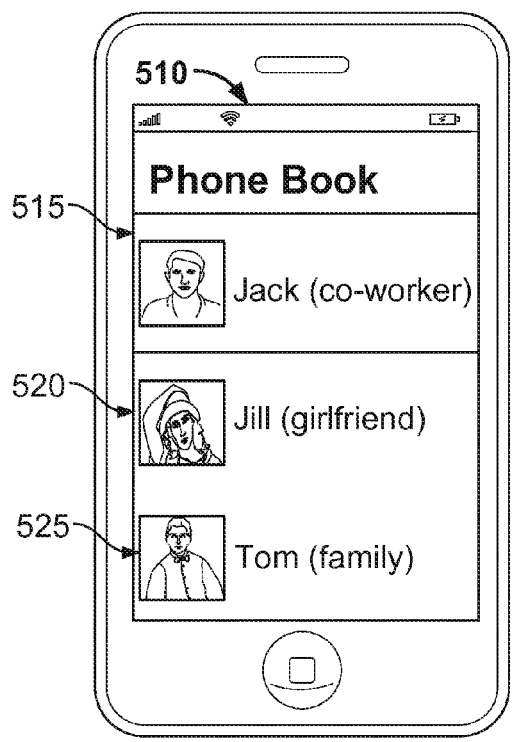
FIG. 5A shows an illustrated application that displays information to be restricted in accordance with some embodiments of the disclosure.

FIG. 5A shows an illustrated application that displays information to be restricted in accordance with some embodiments of the disclosure. In some embodiments, the application may be implemented by a user equipment device or user device such as those illustrated in FIG. 3. FIG. 5A includes a display 510 of a phonebook application, including a first phonebook entry 515, a second phonebook entry 520, and a third phonebook entry 525. In some embodiments, one or more of the phonebook entries may be information to be restricted. For example, control circuitry may determine that a user is in an angry emotional state. Control circuitry 304 may disable access to the phonebook entry 520 for Jill (Girlfriend) and to the phonebook entry 515 Jack (Boss). Control circuitry may disable access to a phonebook entry may be by removing the phonebook entry from display, changing a visual characteristic of the phonebook entry (e.g., graying out, changing a transparency value of the phonebook entry, or changing a border color), or preventing the phonebook entry from being selected. In some embodiments, instead of preventing a user from accessing one or more phonebook entries, control circuitry 304 may sort the phonebook entries in an order and generate or output the phonebook entries for display in the sorted order. For example, in some embodiments, when control circuitry has determined a user to be angry, the control circuitry may sort phonebook entries by a friendship metric such that phonebook entries for persons determined to be closer in friendship to the user appear at the top of the list, and users determined to be further in friendship from the user appear at the bottom.

In some embodiments, phonebook entries may be arranged or filtered by category. For example, control circuitry may sort phonebook entries by family, friends, co-workers, students, or any other suitable classification of persons. A database stored in storage 308 of a user equipment device or in a remote server or the cloud may associate biometric states and/or emotional states with categories of information that are marked for restriction. For example, an angry emotional state indicates that the categories co-workers and students are marked for restriction. Control circuitry 304 of a user equipment device may determine that a user is in the angry state, and disable access to phonebook entries associated with the category co-workers and students.

Figure 5B:
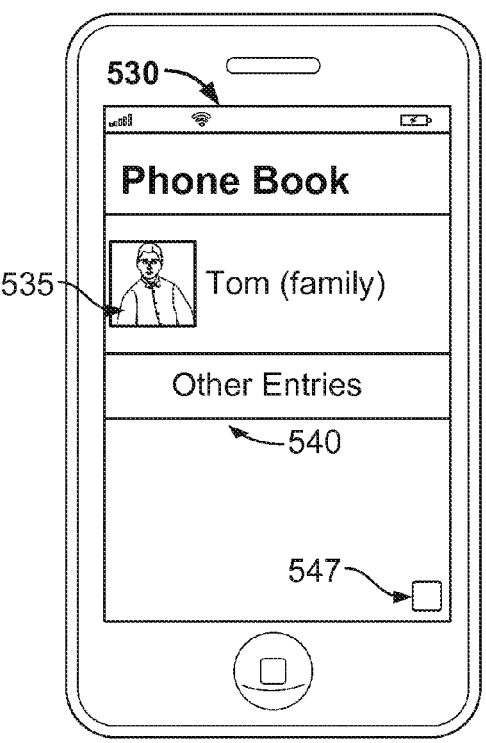
FIG. 5B shows an illustrated application that displays information that has been restricted in accordance with some embodiments of the disclosure.

FIG. 5B shows an illustrated application that displays information that has been restricted in accordance with some embodiments of the disclosure. FIG. 5B includes the display of the phonebook application illustrated in FIG. 5A after access has been disabled to information determined to be restricted based on a determined biometric state or emotional state. For example, control circuitry 304 of a user equipment device may have determined that a user is in the angry emotional state and disabled access to phone entry 515 for Jack, part of the category co-worker, and to phone entry 520 for Jill, part of the category girlfriend. Control circuitry 304 may disable access to phone entry 515 and phone entry 520 by removing the phone entries from display. Accordingly, the application display 530 only includes one phone entry 535 for Tom, who is part of the category family.

In some embodiments, control circuitry implementing an application may receive a user input to access information that is not restricted. For example, control circuitry 304 may generate for display a selectable option 540, labeled "OTHER ENTRIES." In response to receiving a user selection of "OTHER ENTRIES", control circuitry 304 may enable access to other information that is not restricted based on a determined biometric state or emotional state. For example, control circuitry 304 may generate for display other phonebook entries that are part of categories that are determined not to be restricted based on a determined biometric state or emotional state of the user.

In some embodiments, control circuitry implementing an application may receive a user input to access information that is restricted. For example, control circuitry 304 may generate for display an override option 547 to override the restriction. In response to receiving a user selection of the override option 557, control circuitry 304 may re-enable access to the restricted phone entries. In some embodiments, a password may be required to override the restriction of information.

In some embodiments, phonebook entries may include current location information of each of the contacts. For example, a user device of each of the contacts may include processing circuitry that determines a geographic coordinate of each of the contacts. Control circuitry implementing a phonebook application determines that a user is in an angry emotional state based on a biometric state of the user. For example, the control circuitry may cross-reference a biometric state of the user indicating that the user has an elevated body temperature and an elevated pulse rate. The control circuitry determines that location information about co-workers should be restricted from the phonebook application. The control circuitry then filters location information from phonebook entries corresponding to the co-workers category, such as phonebook entry 515. The control circuitry generates a display, similar to the one illustrated in FIG. 5A, except that phonebook entries 520 and 525 include location information for corresponding contacts Jill and Tom, respectively, but phonebook entry 515 for Jack, a co-worker, does not include location information.

In some embodiments, the restriction of location information may also depend on a location of the user. For example, control circuitry implementing a phonebook application may identify information for restriction based on a location of the user, and location of contacts corresponding to phonebook entries. The control circuitry may determine to restrict access to location information of a contact if the location of the contact and the location of the user are within a predetermined proximity. For example, the control circuitry may determine that a user is in an angry emotional state and that information about a location of contacts corresponding to the group co-workers should be restricted. The control circuitry may identify location information for restriction conditioned on whether the location is for a contact in the co-worker group that is within the predetermined proximity of the location of the user. If the location of the co-worker is outside the proximity, the user is unlikely to move to the location of the co-worker, thereby avoiding a potentially antagonistic encounter.

Figure 5C:
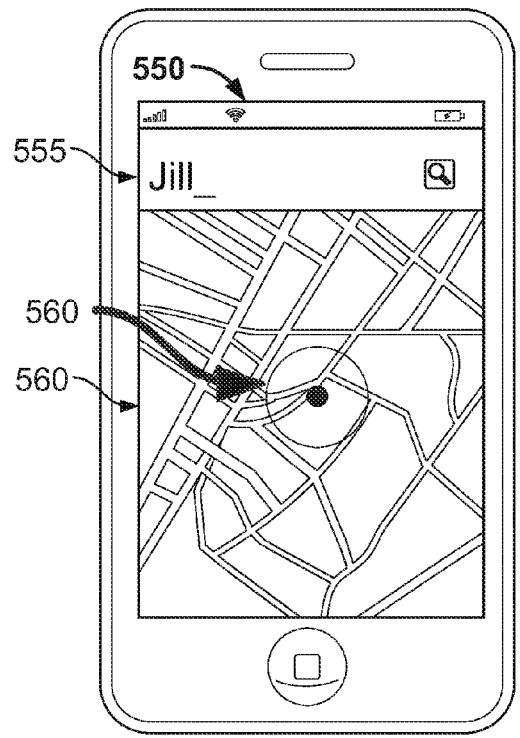
FIG. 5C shows an illustrated application that displays location information to be restricted in accordance with some embodiments of the disclosure.

FIG. 5C shows an illustrated application that displays location information to be restricted in accordance with some embodiments of the disclosure. For example, FIG. 5C includes the display 550 of a map application. Display 550 of the map application includes a search box 555, map display 560 and location information 565. Location information 565 may be a location on the map display 560 that indicates a current location of a user. Search box 555 may be used to enter search terms such as names of places or contact information for people. For example, a user of a user equipment device may enter the name "Jill" corresponding to phone entry 520 in FIG. 5A for "Jill (girlfriend)". Control circuitry 304 implementing the map application may generate for display a location on the map corresponding to a home address for Jill, stored in the phonebook application. Control circuitry 304 may also determine a current location of the person Jill and generate for display the current location of Jill on the map display 560.

In some embodiments, information may be restricted based on location information in addition to a biometric state and/or emotional state of a user. For example, control circuitry 304 may determine a location of a user of the user equipment device implementing the map application. The control circuitry 304 may receive an input for the name Jill in search box 555. In response to receiving the input, the control circuitry 304 may determine a current location of Jill. The control circuitry 304 may determine that a user is in an inebriated biometric state based on pulse rate and blood alcohol level received from detecting circuitry 320 and monitoring component 316. Control circuitry 304 may cross-reference the inebriated state with a database and determine that access to information about the category of phonebook entries, girlfriends, should be disabled if a location between the user and a person of category girlfriends is less than a predetermined distance. In response, control circuitry 304 may disable access to the information about the girlfriend.

In some embodiments, information may be restricted based on the likelihood that a user may reach a location given a biometric state of a user. For example, the likelihood may be determined based on a geographic distance between the user and a searched user. For example, the likelihood may be based in part on a time of day.

For example, control circuitry implementing a map application may receive a search term in search box 555 for the person "Jill" corresponding to the category girlfriend. The control circuitry determines that a user is in an angry emotional state based on a biometric state of elevated blood pressure and elevated body temperature of the user. The control circuitry cross-references the biometric state and emotional state with a biometric state-restriction information and an emotional state-restriction information database and determines that location information associated with the contact Jill should be restricted. The control circuitry identifies a portion of the location for restriction.

In some embodiments, the control circuitry identifies a portion of the location information for restriction based on a location of the user. For example, the control circuitry determines that a portion of information about location of the contact Jill is restricted based on whether the contact is within one or more predetermined proximities of the user. The control circuitry may determine that the contact Jill is within a first predetermined proximity (e.g., 0.5 mile of the user) and determine that a first portion of location information (e.g., geographic coordinates of Jill, a street address for Jill) and/or a second portion of location information, e.g., name of the location of Jill (e.g., home, work, or a name of a building at which Jill is located), should be restricted from access. The control circuitry may determine that the contact Jill is between the first predetermined proximity (e.g., 0.5 mile of the user) and a second predetermined proximity (e.g., 1 mile of the user), and determine that the first portion of location information (e.g., geographic coordinates, address) is restricted while the second portion of location information (e.g., a name of the building in which Jill is located), is not restricted. The control circuitry determines that there is a lower likelihood that the user will be able to determine Jill's geographic location based on the building, and/or that the user has a lower likelihood of moving to Jill's location even if the user were able to determine Jill's location.

Figure 5D:
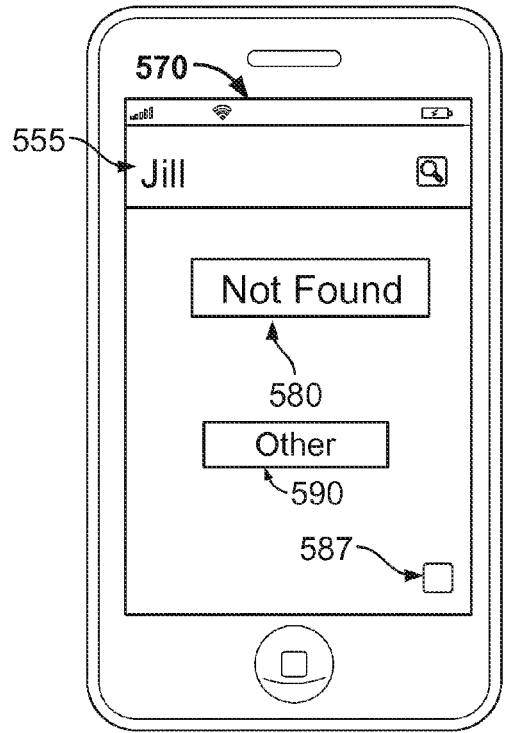
FIG. 5D shows an illustrated application that displays location information that has been restricted in accordance with some embodiments of the disclosure.

FIG. 5D shows an illustrated application that displays location information that has been restricted in accordance with some embodiments of the disclosure. For example, control circuitry 304 implementing the map application discussed in reference to FIG. 5C may determine that information about Jill is restricted. In response, control circuitry 304 may disable the generating for display the current location of Jill or disable generating for display the home address of Jill. For example, control circuitry 304 may generate for display a results display 570 that includes a message 580 that indicates locations for the term "Jill" is not found.

In some embodiments, a portion of information about a location or search term that is not restricted may be identified and the information may be presented to a user. For example, the results display 570 may include a selectable menu item 590 labeled "OTHER". The presence of menu item "OTHER" may provide other information about Jill, for example, an e-mail address. In response to receiving a user selection of menu item 590, control circuitry 304 may generate for display contact information for Jill. While a user is unable to determine where Jill is in the inebriated state, the user may still be able to contact Jill.

In some embodiments, an application such as the map application discussed in reference to FIG. 5C may receive a user input to access information that is restricted. For example, control circuitry may generate for display a selectable menu item 587 to override the restriction. In response to receiving a user selection of the override option 557, control circuitry 304 may re-enable access to the restricted location information for Jill. In some embodiments, a password may be required to override the restriction of information.

In some embodiments, access to information may be restricted based on a time of day in addition to a biometric state or emotional state of a user. For example, in reference to the map application of FIG. 5C and FIG. 5D, a user may enter a search term for shopping centers. Control circuitry 304 of a user equipment device may determine that a user is hungry based on blood sugar levels measured from the user. Control circuitry 304 may also determine that the search term has been entered at 7:00 AM in the morning. In response, control circuitry 304 may determine that a portion of information about lunch and dinner eateries should be restricted from the results display in the map. Control circuitry 304 may determine that a first portion of location information (e.g., a street address) is restricted but that a second portion of location (e.g., the town) is not restricted. In this way, a user may access general information about eateries, may not go the location of eateries that do not include a street address. In the alternative, if control circuitry 304 determined that the search term has been entered at 12:00 PM in the afternoon, the control circuitry 304 would determine that the first portion of information and second portion of information about lunch eateries is not to be restricted from the results display in the map.

Figure 6:
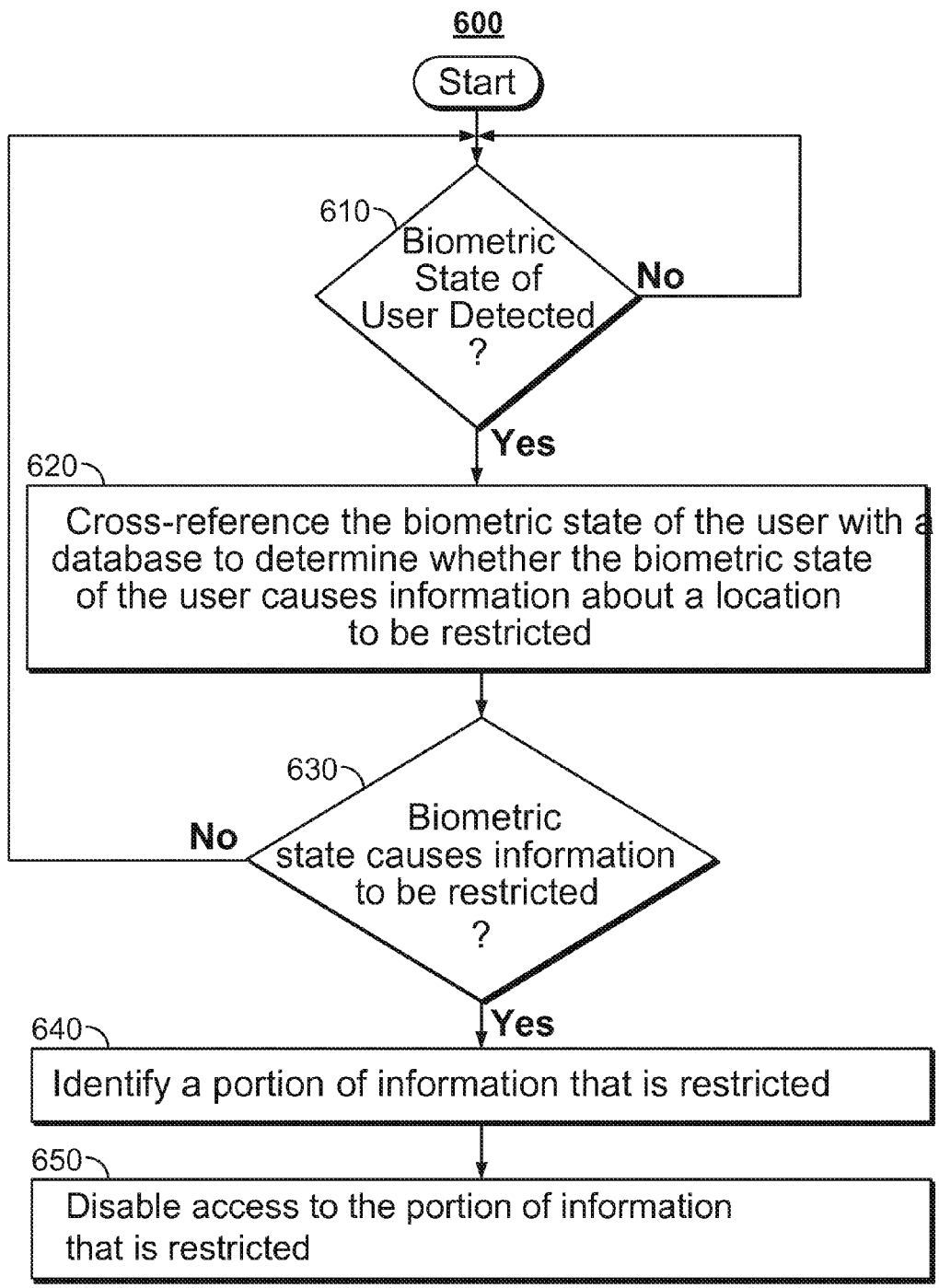
FIG. 6 is a flow chart of illustrative steps involved in determining a biometric state of a user and disabling access to information based on the biometric state in accordance with some embodiments of the disclosure.

FIG. 6 is a flow chart of illustrative steps involved in determining a biometric state of a user and disabling access to information based on the biometric state in accordance with some embodiments of the disclosure. It should be noted that process 600, or any step thereof, could be performed in any suitable order and provided by any of the devices shown in FIG. 3 and FIG. 4. For example, the process 600 may be executed by control circuitry 304 (FIG. 3) on user equipment device 402, 404 and/or 406 (FIG. 4). In addition, one or more steps of process 600 may be incorporated into or combined with one or more steps of any other process (e.g., as described in FIG. 7).

At step 610, control circuitry 304 implementing an application determines whether a biometric state of a user has been detected. For example, detecting circuitry 320 may determine whether any type of biometric state can be detected by one or monitoring components 316. If a biometric state cannot be detected, the process polls on step 610. If a biometric state is detected, the process proceeds to step 620.

At step 620, the control circuitry cross-references the biometric state of the user with a database to determine whether the biometric state of the user causes information about a location to be restricted. For example, control circuitry 304 may receive an indicator of the detected biometric state from detecting circuitry 320. Control circuitry 304 may then cross-reference the biometric state with a biometric state-information restriction database stored in storage 308, a remote server, the cloud, or any other suitable storage. The database may indicate that certain information is restricted based on a detected biometric state by storing an association between biometric states with the certain information to be restricted. For example, the database may store an association of an angry biometric state with certain contacts, phonebook entries, categories of contacts or phonebook entries to be restricted. For example, the database may associate an angry biometric state with certain locations such as gun stores or schools, where anger may cause negative interactions with surrounds or other people. In some embodiments, the associations in the database may be pre-determined and updated from a remote server, the cloud or other suitable source at periodic intervals. In some embodiments, the associations in the database may be entered manually by a user, or updated by a user.

At step 630, the control circuitry determines whether the biometric information causes information to be restricted. For example, control circuitry 304 that implements application may query the biometric state-information restriction database and determine whether there is an entry associated with the determined biometric state. If the control circuitry determines that there is information to be restricted, the process proceeds to step 640.

At step 640, the control circuitry identifies a portion of the information that is restricted. For example, the biometric state-information restriction database may include an association between the angry state and a category of contacts for co-workers, and a category of contacts for girlfriends. Control circuitry 304 of the user equipment device may send a command to a phonebook application to identify phonebook entries that are part of the restricted category for co-workers and that are part of the restricted category for girlfriends. Control circuitry 304 may also determine an address location for each of the phonebook entries that are restricted, and restrict access to those locations, for example, from a map application.

In some embodiments, identifying the portion of the information that is restricted includes receiving criteria for the portion of the information that is restricted and comparing the information about the location to the criteria. For example, control circuitry 304 may receive a search criteria in the map application described in reference to FIG. 5C and FIG. 5D for "nearby contacts" to show current locations of contacts corresponding to phonebook entries of a phonebook application of the user. In response, control circuitry 304 may retrieve phonebook entries that correspond to the criteria "nearby contacts", and compare the retrieved phonebook entries to restricted entries.

At step 640, an application disables access to the portion of information that is restricted. For example, in response to determining that a subset of the retrieved phonebook entries correspond to restricted entries, control circuitry 304 will disable the restricted entries from display in the map application.

Figure 7:
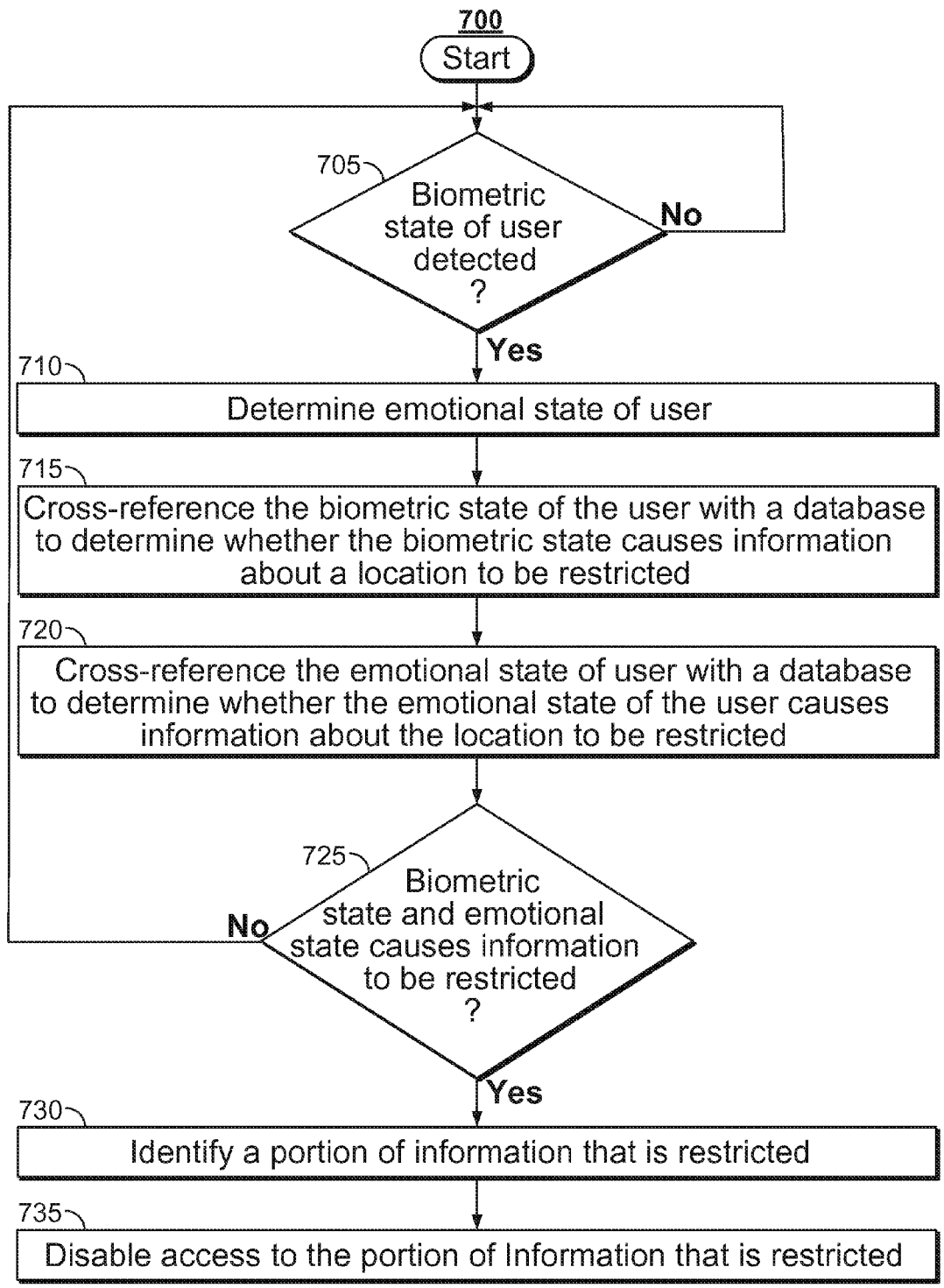
FIG. 7 is a flow chart of illustrative steps involved in determining a biometric state and an emotional state of a user and disabling access to information based on the biometric state and the emotional state in accordance with some embodiments of the disclosure.

FIG. 7 is a flow chart of illustrative steps involved in determining a biometric state and an emotional state of a user and disabling access to information based on the biometric state and the emotional state in accordance with some embodiments of the disclosure. It should be noted that process 700, or any step thereof, could be performed in any suitable order and provided by any of the devices shown in FIG. 3 and FIG. 4. For example, the process 600 may be executed by control circuitry 304 (FIG. 3) on user equipment device 402, 404 and/or 406 (FIG. 4).

At step 705, an application determines whether a biometric state of a user has been detected. For example, detecting circuitry 320 may determine whether any type of biometric state can be detected by one or monitoring components 316. If a biometric state cannot be detected, the process polls on step 705. If a biometric state is detected, the process proceeds to step 710.

At step 710, the application determines an emotional state of the user. For example, control circuitry 304 implementing the application may cross-reference a detected biometric state of a user with a biometric state-emotional state database that is stored on storage 308, a remote server, the cloud, or any other suitable storage. For example, detecting circuitry 320 may detect an elevated blood temperature and elevated heart rate. Control circuitry 304 may cross-reference the values of the elevated body temperature and elevated heart rate with the biometric state-emotional state database to determine that the user is in an angry emotional state.

At step 715, the application cross-references the detected biometric state of the user with a biometric state-restricted information database to determine whether the biometric state causes information about a location to be restricted. For example, control circuitry 304 may cross-reference the elevated body temperature and elevated heart rate biometric states with a biometric state-restricted information database and determine whether there is an entry associated with the determined biometric state.

At step 720, the application cross-references the determined emotional state of the user with an emotional state-restricted information database to determine whether the determined emotional state of the user causes information about a location to be restricted. For example, control circuitry 304 may cross-reference the angry emotional state with the emotional state-restricted information database to determine whether there is an entry for the angry emotional state.

At step 725, the application determines whether the detected biometric state and the determined emotional state causes information to be restricted. For example, based on the cross-reference with the biometric state-information restriction and emotional state-information restriction databases, control circuitry can determine whether there were any entries corresponding to the detected biometric state and the determined emotional state. If there is no entry result from either cross-reference step, the process returns to step 705. If there is an entry for either cross-reference step, the process proceeds to step 730.

At step 730, the application identifies a portion of information that is restricted. For example, control circuitry 304 may cross-reference the elevated body temperature and elevated heart rate biometric states with a biometric state-restricted information database and determine that a category of contacts for co-workers, associated with elevated body temperature and elevated heart rate indicative of stress, is restricted. For example, control circuitry 304 may cross-reference the angry emotional state with the emotional state-restricted information database to determine that a category of contacts for girlfriends is restricted. Control circuitry 304 of the user equipment device may send a command to a phonebook application to identify phonebook entries that are part of the restricted category for co-workers and that are part of the restricted category for girlfriends. Control circuitry 304 may also determine an address location for each of the phonebook entries that are restricted, and restrict access to those locations, for example from a map application.

In some embodiments, identifying the portion of the information that is restricted includes receiving criteria for the portion of the information that is restricted and comparing the information about the location to the criteria. For example, control circuitry 304 may receive a search criteria in the map application described in reference to FIG. 5C and FIG. 5D for "nearby contacts" to show current locations of contacts corresponding to phonebook entries of a phonebook application of the user. In response, control circuitry 304 may retrieve phonebook entries that correspond to the criteria "nearby contacts", and compare the retrieved phonebook entries to restricted entries.

At step 735, the application disables access to the portion of information that is restricted. For example, in response to determining that a subset of the retrieved phonebook entries correspond to restricted entries, control circuitry 304 will disable the restricted entries from display in the map application.

Figure 8:
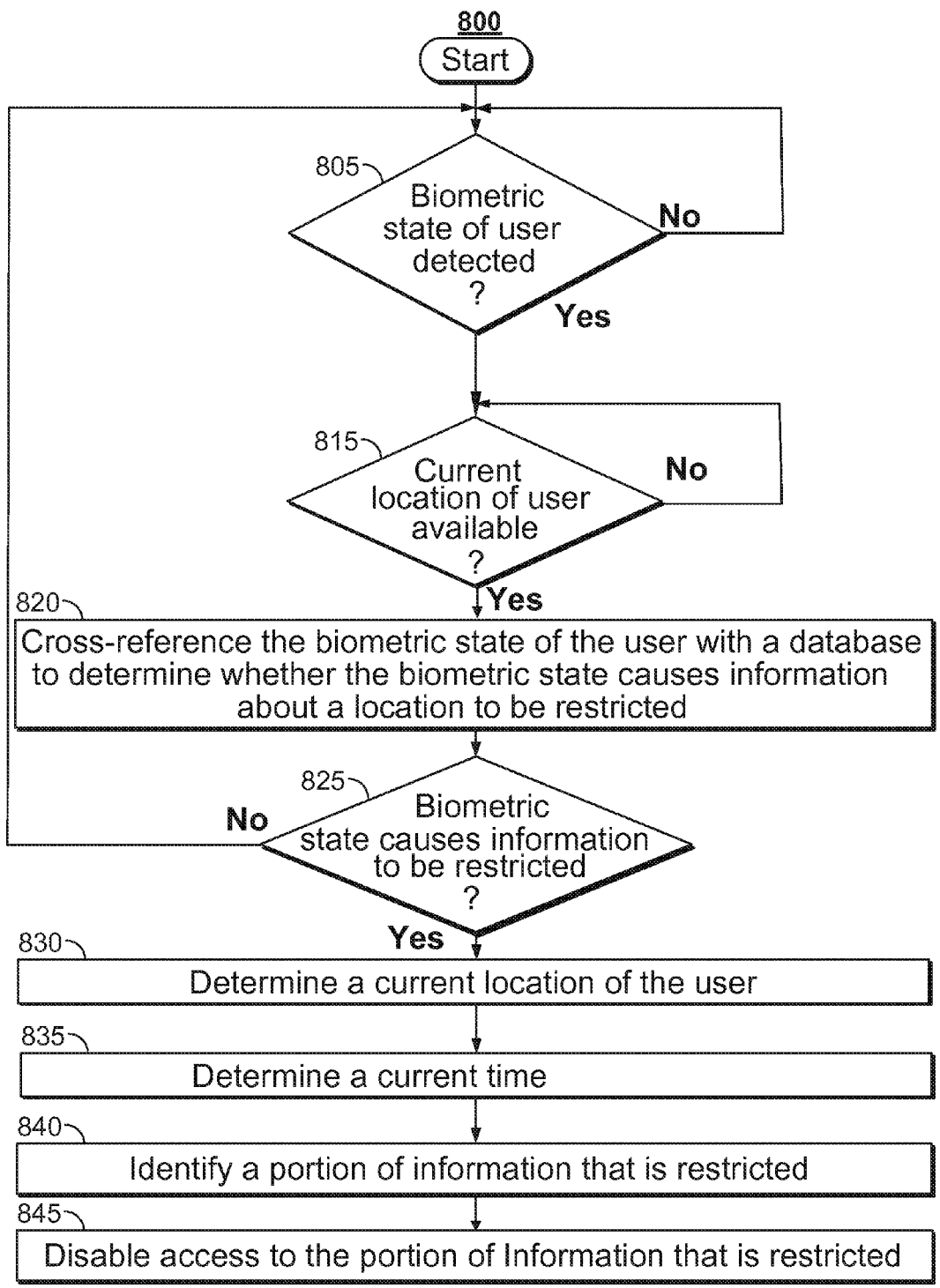
FIG. 8 is a flow chart of illustrative steps involved in identifying a portion of information to be restricted based on a current time of day and a current location of the user in accordance with some embodiments of the present disclosure.

FIG. 8 is a flow chart of illustrative steps involved in identifying a portion of information to be restricted based on a current time of day and a current location of the user in accordance with some embodiments of the disclosure. It should be noted that process 800, or any step thereof, could be performed in any suitable order and provided by any of the devices shown in FIG. 3 and FIG. 4. For example, the process 600 may be executed by control circuitry 304 (FIG. 3) on user equipment device 402, 404 and/or 406 (FIG. 4).

At step 805, detecting circuitry 320 implementing an application determines whether a biometric state of a user has been detected. For example, detecting circuitry 320 may determine whether any type of biometric state can be detected by one or more monitoring components 316. If a biometric state cannot be detected, the process polls on step 805. If a biometric state is detected, the process proceeds to step 810.

At step 815, control circuitry 304 determines whether a current location of the user is available. For example, control circuitry 304 implementing the application may check whether location information can be determined from a GPS receiver, cellular tower information. If a current location is not available, the process polls on step 815. If a current location is available, the process proceeds to step 820.

At step 820, control circuitry 304 cross-references the detected biometric state of the user with a biometric state-restricted information database to determine whether the biometric state causes location information about a location to be restricted. For example, control circuitry 304 may cross-reference the elevated body temperature and elevated heart rate biometric states with a biometric state-restricted information database and determine whether there is an entry associated with the determined biometric state. The process proceeds to step 825.

At step 825, control circuitry 304 determines whether the biometric state causes information to be restricted. For example, the control circuitry 304 may query the biometric state-information restriction database and determine whether there is an entry associated with the determined biometric state. If the control circuitry determines that there is information to be restricted, the process proceeds to step 830.

At step 830, control circuitry 304 determines a current location of the user. For example, the control circuitry may receive GPS coordinates from a GPS receiver, or may receive cellular coordinates from a cellular receiver. The control circuitry may transmit GPS coordinates or cellular tower coordinates to a central database at a server to retrieve a street address of the user or a landmark near the location of the user. The process proceeds to step 835.

At step 835, the control circuitry determines a current time. For example, control circuitry may poll an internal clock, determine time based on the GPS receiver, determine time based on the cellular receiver, or retrieve time from a cloud service. Control circuitry may determine that the current time is 3:00 PM in the afternoon. The process proceeds to step 840.

At step 840, the application identifies a portion of information that is restricted. For example, control circuitry 304 may cross-reference elevated body temperature and elevated heart rate biometric states of a user with a biometric state-restricted information database and determine that a category of contacts for co-workers, associated with elevated body temperature and elevated heart rate, indicative of stress, is restricted. For example, control circuitry 304 may determine that the user is an excited biometric state determined in steps 815 and/or 820. Control circuitry may cross-reference the excited biometric state with the biometric state-restricted information database to determine that location information for a category of contacts for girlfriends is restricted.

Control circuitry 304 may determine that a first portion of location information (e.g., geographic coordinates) of a girlfriend contact is restricted if the user is within a first proximity of the user. Control circuitry 304 may determine that a second portion of location information (e.g., a name of a building, restaurant, or landmark) of a girlfriend contact) is not restricted based on the current time (e.g., 3:00 PM in the afternoon). Control circuitry may determine that geographic coordinates of a girlfriend contact within a certain proximity should be restricted from the user because the user may be distracted while in the excited state. However, because the current time is 3:00 PM, the user is at work and can access a name of a building where the girlfriend contact is located because the user is unlikely to exhaust time to move near the building to search for the girlfriend contact.

At step 845, the application disables access to the portion of information that is restricted. For example, in response to determining that the first portion of location information (e.g., geographic coordinates) for girlfriend contacts should be restricted, while the second portion of location information (e.g., name of a building at which a girlfriend contact is located) is not restricted, control circuitry 304 will filter the restricted portion of information from display in a map application.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

What is claimed is:

1. A method of restricting, based on biometric conditions of a first person, access to information about a location of a second person different from the first person, the method comprising:
   determining, using control circuitry, a biometric state and an emotional state of the first person;
   retrieving, using the control circuitry, based on the biometric state and the emotional state of the first person, from a database, the information about the location to be restricted;
   identifying, using the control circuitry, a portion of the information that is to be restricted about the location of the second person different from the first person; and
   disabling, using the control circuitry, access for the first person to the portion of the information that is to be restricted about the location of the second person different from the first person, such that the first person with the determined biometric state and the determined emotional state is unable to view the portion of the information about the location of the second person.

2. The method of claim 1, wherein the biometric state comprises one of a heart rate, pulse, blood oxygen level, body temperature, and brain activity.

3. The method of claim 1, further comprising:
   identifying a portion of the information about the location that is not restricted; and
   in response to a user request, by the first person, for available information about the location, generating for display the portion of the information about the location that is not restricted.

4. The method of claim 3, wherein the portion of the information about the location that is restricted relates to geographical coordinates.

5. The method of claim 3, wherein disabling access to the portion of the information about the location that is restricted further comprises filtering data provided to the first person.

6. The method of claim 1, wherein identifying the portion of the information that is restricted, further comprises:
   receiving criteria for the portion of the information about the location that is restricted;
   comparing the information about the location to the criteria.

7. The method of claim 1, wherein the portion of the information about the location that is restricted is based at least in part on a current time of day.

8. The method of claim 1, wherein the portion of the information about the location that is restricted is based at least in part on a current location of the first person.

9. The method of claim 1, wherein the portion of the information about the location that is restricted is based at least in part on a likelihood that the first person may reach the location given the biometric state of the first person.

10. A system for restricting, based on biometric conditions of a first person, access to information about a location of a second person different from the first person, the system comprising:
    detecting circuitry configured to determine a biometric state of the first person, wherein the first person is a user of the system; and
    control circuitry configured to:
    determine an emotional state of the first person;
    retrieve based on the biometric state and the emotional state of the first person, from a database, the information about the location to be restricted;
    identify a portion of the information that is to be restricted about the location of the second person different from the first person; and
    disable access for the first person to the portion of the information that is to be restricted about the location of the second person different from the first person, such that the user first person with the determined biometric state and the determined emotional state is unable to view the portion of the information about the location of the second person.

11. The system of claim 10, wherein the biometric state comprises one of a heart rate, pulse, blood oxygen level, body temperature, and brain activity.

12. The system of claim 10, wherein the control circuitry is further configured to:
    identify a portion of the information about the location that is not restricted; and
    generate for display, the portion of the information about the location that is not restricted, in response to a user request, by the first person, for available information about the location.

13. The system of claim 12, wherein the portion of the information about the location that is restricted relates to geographical coordinates.

14. The system of claim 12, wherein the control circuitry is configured to disable access to the portion of the information about the location that is restricted further by filtering data provided to the first person.

15. The system of claim 10, wherein the control circuitry is configured to identify the portion of the information about the location that is restricted by:
    receiving criteria for the portion of the information about the location that is restricted; and
    comparing the information about the location to the criteria.

16. The system of claim 10, wherein the portion of the information about the location that is restricted is based at least in part on a current time of day.

17. The system of claim 10, wherein the portion of the information about the location that is restricted is based at least in part on a current location of the first person.

18. The system of claim 10, wherein the portion of the information about the location that is restricted is based at least in part on a likelihood that the first person may reach the location given the biometric state of the first person.

* * * * *